US008885350B2

(12) United States Patent
Liu

(10) Patent No.: US 8,885,350 B2
(45) Date of Patent: Nov. 11, 2014

(54) DISPLAY DEVICE AND TELEVISION RECEIVER

(75) Inventor: Hokshing Liu, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 931 days.

(21) Appl. No.: 13/060,734

(22) PCT Filed: Jun. 11, 2009

(86) PCT No.: PCT/JP2009/060660
§ 371 (c)(1),
(2), (4) Date: Feb. 25, 2011

(87) PCT Pub. No.: WO2010/032520
PCT Pub. Date: Mar. 25, 2010

(65) Prior Publication Data
US 2011/0170017 A1 Jul. 14, 2011

(30) Foreign Application Priority Data
Sep. 17, 2008 (JP) ................ 2008-238542

(51) Int. Cl.
*H05K 1/00* (2006.01)
*G02F 1/1333* (2006.01)
*H04N 5/64* (2006.01)
*G02F 1/1345* (2006.01)

(52) U.S. Cl.
CPC ............ *H04N 5/64* (2013.01); *G02F 1/133308* (2013.01); *G02F 1/13452* (2013.01); *G02F 1/133385* (2013.01)
USPC ................. 361/749; 361/679.06; 361/679.21; 361/679.23; 174/252; 174/254

(58) Field of Classification Search
USPC ................................. 174/250–258
See application file for complete search history.

(56) References Cited

U.S. PATENT DOCUMENTS 7,064,952 B1 * 6/2006 Chen et al. ............... 361/679.01
2004/0263505 A1 12/2004 Tsubokura et al.
(Continued)

FOREIGN PATENT DOCUMENTS

JP 09-319311 A 12/1997
JP 10-222086 A 8/1998
(Continued)

OTHER PUBLICATIONS

Official Communication issued in International Patent Application No. PCT/JP2009/060660, mailed on Jul. 14, 2009.

*Primary Examiner* — Tuan T Dinh
(74) *Attorney, Agent, or Firm* — Keating & Bennett, LLP

(57) ABSTRACT

A display device includes a display panel, a holding member, a circuit board and a heat-transfer member. The display panel is configured to display images. The holding member holds the display panel. The circuit board arranged so as to face the holding member and connected to the display panel. The heat-transfer sheet is arranged between the circuit board and the holding member so as to be in contact with the circuit board and the holding member. The heat-transfer sheet has a circuit board fixing portion, a holding member fixing portion and flexible connection portions that make connections between the fixing portions. The circuit board fixing portion is attached to the circuit board and separated from the holding member. The holding member fixing portion is attached to the holding member and separated from the circuit board. Therefore, a display quality is less likely to decrease.

14 Claims, 11 Drawing Sheets

(56) References Cited

U.S. PATENT DOCUMENTS

| | | |
|---|---|---|
| 2005/0073622 A1 | 4/2005 | Kitaka et al. |
| 2005/0194900 A1* | 9/2005 | Kim et al. ................. 313/582 |
| 2005/0219439 A1 | 10/2005 | Kitada et al. |
| 2006/0023153 A1 | 2/2006 | Taguchi |
| 2007/0109747 A1* | 5/2007 | Sengoku et al. ............ 361/714 |
| 2008/0013010 A1 | 1/2008 | Kitada et al. |
| 2008/0303974 A1 | 12/2008 | Kitada et al. |

FOREIGN PATENT DOCUMENTS

| | | |
|---|---|---|
| JP | 2004-163638 A | 6/2004 |
| JP | 2005-017791 A | 1/2005 |
| JP | 2006-039316 A | 2/2006 |

* cited by examiner

DISPLAY DEVICE AND TELEVISION RECEIVER

TECHNICAL FIELD

The present invention relates to a display device configured to display images and a television receiver.

BACKGROUND ART

A liquid crystal display device disclosed in Patent Document 1 is known as one of display devices configured to display images. This crystal display device includes a liquid crystal panel on which images are displayed and control boards for controlling driving of the liquid crystal panel. The control boards are arranged in edge areas of the liquid crystal panel and connected to the liquid crystal panel via flexible printed circuit boards. Each flexible printed circuit board includes a driver mounted on a film substrate having flexibility. One of ends of the flexible printed circuit board is connected to a terminal of the liquid crystal panel and the other end to a terminal of the corresponding control board.

The flexible printed circuit boards produce heat as the liquid crystal display device is driven. The following method is known as a method for dissipating the heat. Heat-transfer sheets are placed between the flexible printed circuit boards and a holding member for holding the liquid crystal panel, such as a bezel. The heat-transfer sheets are fixed such that surfaces of the heat-transfer sheets are in close contact with the flexible printed circuit boards and the holding member, respectively. The heat from the flexible printed circuit boards are transferred to the holding member via the heat-transfer sheets and dissipated to the outside.

Patent Document 1: Japanese Published Patent Application No. 2006-39316

Problem to be Solved by the Invention

A material of the glass substrates and that of the holding member included in the liquid crystal panel have significantly different thermal expansion coefficients. If the flexible printed circuit boards connected to the liquid crystal panel are fixed to the holding member via the heat-transfer sheets, stresses may be applied to connections between the flexible printed circuit boards and the liquid crystal panel. In such a case, the flexible printed circuit boards may come off of the liquid crystal panel and a display quality of the liquid crystal display device may decrease. Especially, liquid crystal display devices have been increasing in size, and amounts of deformations of the liquid crystal panel and the holding member due to thermal expansion and contraction may increase. Therefore, a solution for such a problem is needed.

DISCLOSURE OF THE PRESENT INVENTION

The present invention was made in view of the foregoing circumstances. An object of the present invention is to provide a display device that does not cause display quality degradation.

Problem to be Solved by the Invention

A display device of the present invention includes a display panel, a holding member, at least one circuit board and at least one heat-transfer member. The display panel is configured to display images. The holding member holds the display panel. The at least one circuit board is arranged so as to face the holding member and connected to the display panel. The at least one heat-transfer member is arranged between the circuit board and the holding member so as to be in contact with the circuit board and the holding member. The heat-transfer member has a circuit board fixing portion, a holding member fixing portion, and at least one flexible connection portion that makes a connection between the circuit board fixing portion and the holding member fixing portion. The circuit board fixing portion is attached to the circuit board and separated from the holding member. The holding member fixing portion is attached to the holding member and separated from the circuit board.

The flexible connection portion is deformable and the deformation thereof allows the circuit board fixing portion and the holding member fixing portion to move relative to each other. Even when amounts of thermal deformations of the display panel and the holding member differ from each other, the circuit board fixing portion moves along with the circuit board and the holding member fixing portion moves along with the holding member. Therefore, a force applied to a connection between the circuit board and the display panel is small and thus the connection is less likely to come loose and the display quality is less likely to decrease.

The flexible connection portion may be separated from the circuit board and the holding member.

BEST MODE FOR CARRYING OUT THE INVENTION

First Embodiment

Figure 1:
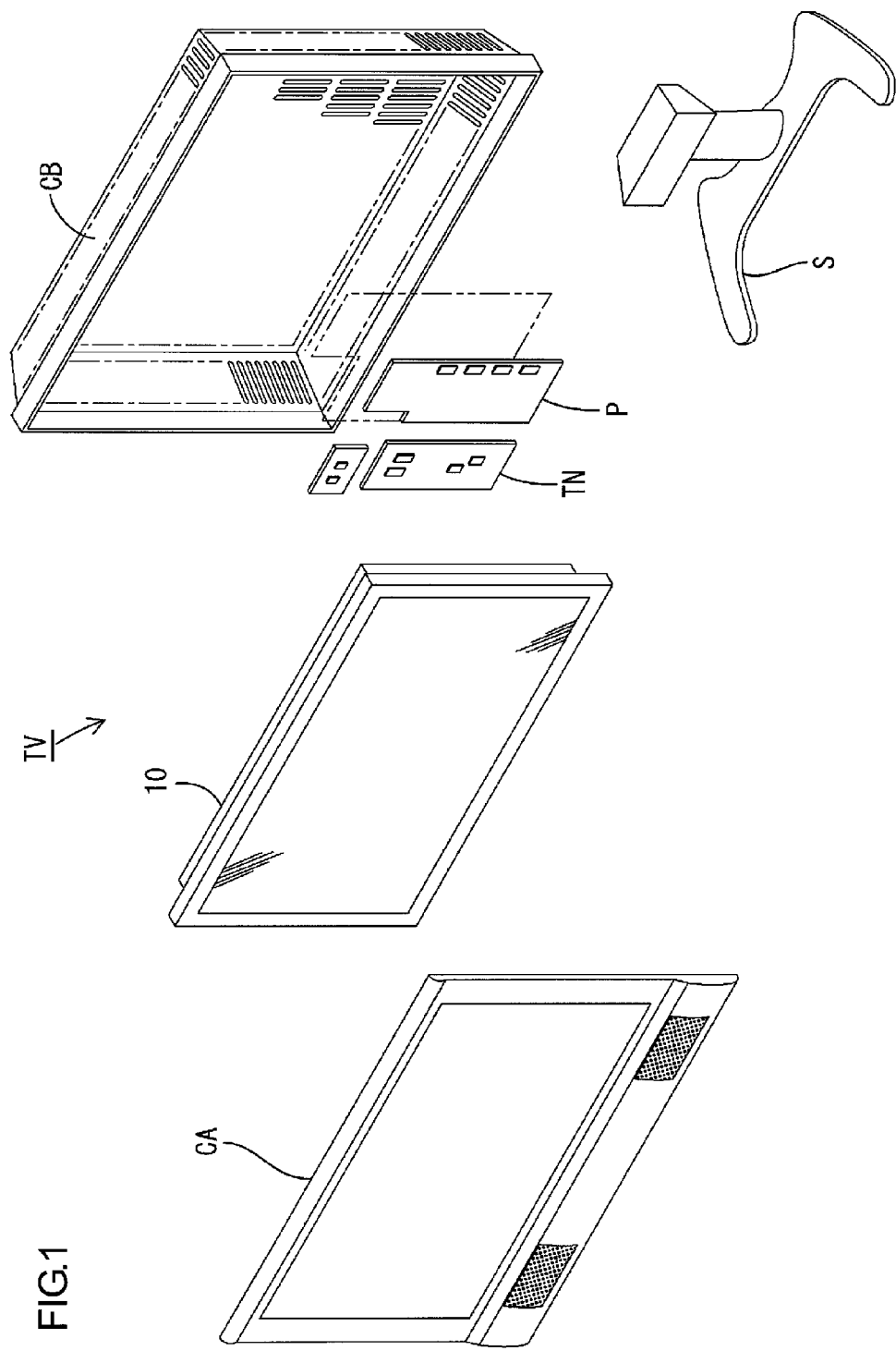
FIG. 1 is an exploded perspective view illustrating a general construction of a television receiver according to the first embodiment.

The first embodiment of the present invention will be explained with reference to FIGS. 1 to 8. In this embodiment, a television receiver TV including a liquid crystal display device 10 (a display device) will be explained. As illustrated in FIG. 1, the television receiver TV includes the liquid crystal display device 10, cabinets CA, CB, a power source P, a tuner TN and a stand S. The cabinets CA and CB sandwich the liquid crystal display device 10 from the front and the rear. The tuner TN is configured to receive television broadcasting. The liquid crystal display device 10 is set in a vertical position in which a display surface thereof is set along a substantially vertical direction and housed in the cabinets CA and CB. Next, parts of the television receiver TV will be explained. In FIG. 1, the lower left (a front side of the television receiver TV or a display side) and the upper right correspond to the front side and the rear side, respectively.

Figure 2:
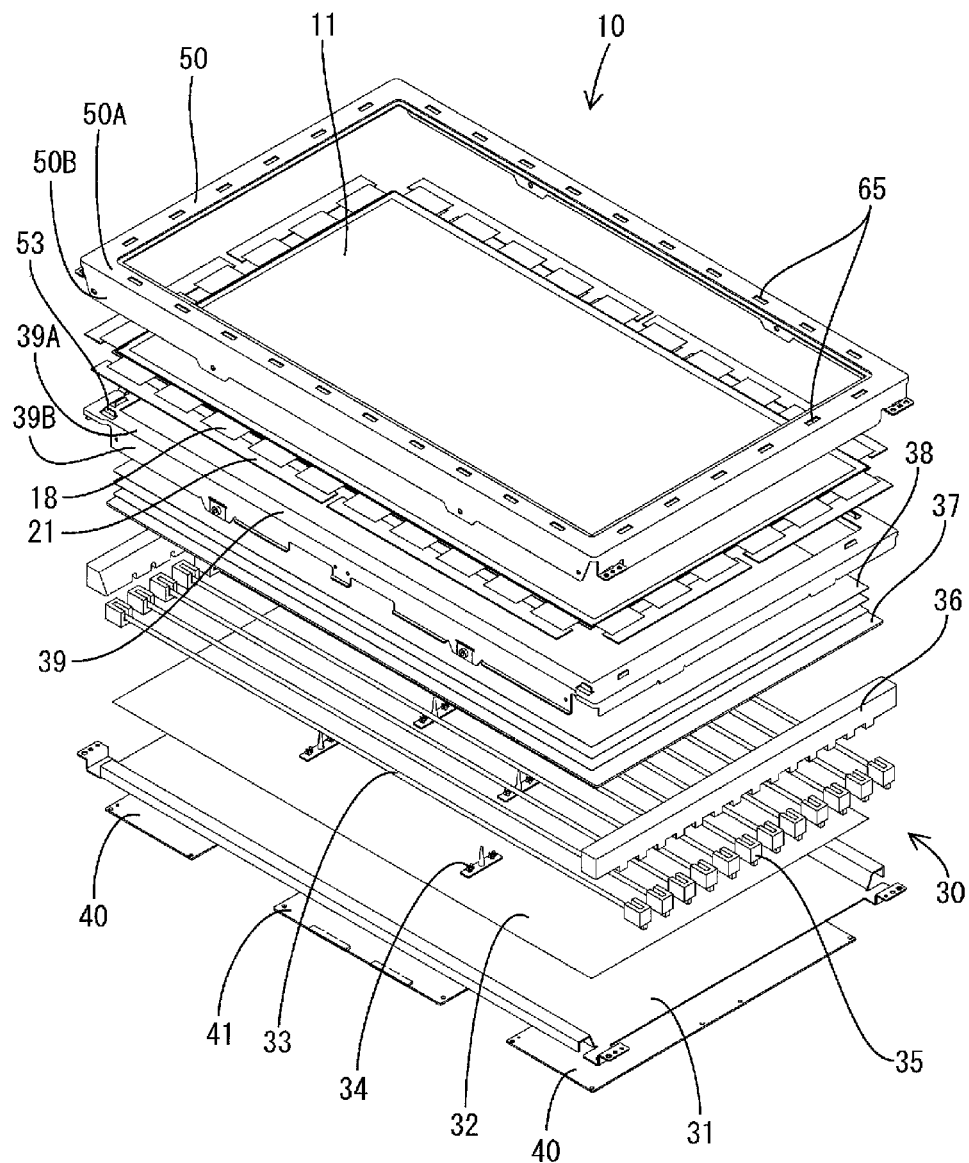
FIG. 2 is an exploded perspective view illustrating a general construction of a liquid crystal display device.
Figure 3:
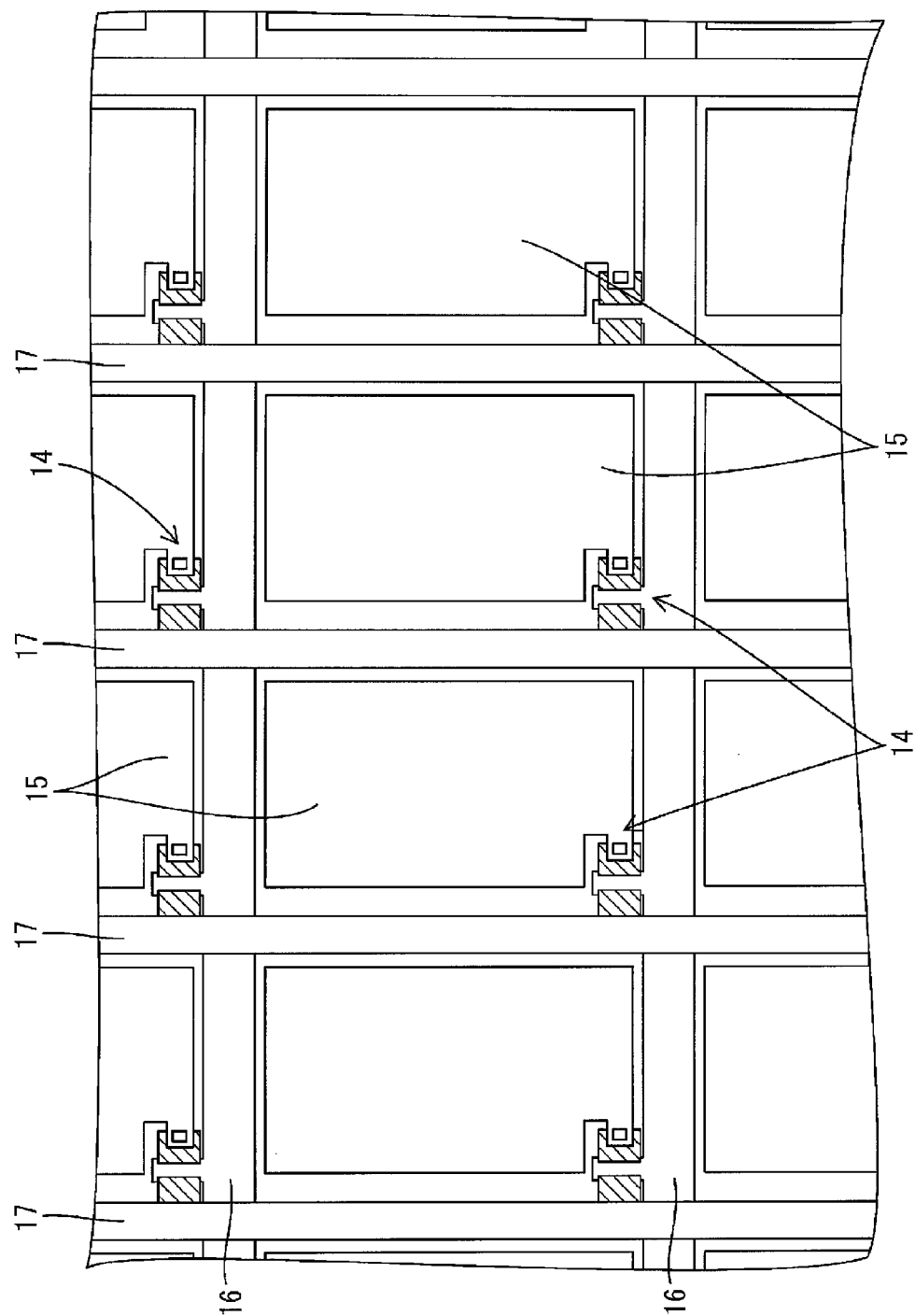
FIG. 3 is a magnified plan view of an array board of the liquid crystal panel.

An overall shape of the liquid crystal display device 10 is a landscape rectangular. As illustrated in FIG. 2, the liquid crystal display device 10 includes a liquid crystal panel 11 (a display panel of the claims) and a backlight unit 30, which is an external light source that illuminates the liquid crystal panel 11. They are held together by a holding member such as a bezel 50.

The liquid crystal panel 11 has a pair of transparent glass substrates 12 and 13 (i.e., capable of light transmission) and liquid crystals (not shown) that change optical characteristics according to application of voltages. The liquid crystals are provided between the substrates 12 and 13.

One of the substrates 12 and 13 on the front side is a CF substrate 12 and the other on the rear side is an array substrate 13. On the inner surface of the array substrate 13 (the surface facing the CF substrate 12), a number of thin film transistors (TFTs) 14 that are switching components and pixel electrodes 15 are arranged (see FIG. 3). Drain terminals of the TFTs 14 are connected to the respective pixel electrodes 15. Gate lines 16 and source lines 17 are formed in grid patterns around the TFTs 14 and the pixel electrodes 15. The gate lines 16 and the source lines 17 are connected to the gate terminals and the source terminals of the TFTs 14, respectively.

In edge areas of the array substrate 13 outside a display area (or an active area) in which the TFTs 14 and the pixel electrodes 15 are arranged, terminals (not shown) of the lines 16 and 17 are provided. Flexible printed circuit boards 18 (circuit boards of the claims) are connected to the array substrate 13 of the liquid crystal panel 11. The array substrate 13 is slightly larger than the CF substrate 12. The terminals connected to the flexible printed circuit boards 18 on the array substrate 13 are exposed and do not overlap the CF substrate 12.

Each flexible printed circuit board 18 includes a thin film 19 having flexibility. Circuit patterns (not shown) are printed and a driver 20 (an electronic component of the claims), which is an LSI chip, is mounted on the film 19 (see FIG. 5). The flexible printed circuit board 18A may be a tape carrier package (TCP), a chip on film (COF) or a system on film (SOF). The flexible printed circuit board 18 has a rectangular overall shape and the driver 20 is mounted to the rear surface of the film 19 in the central area.

Figure 4:
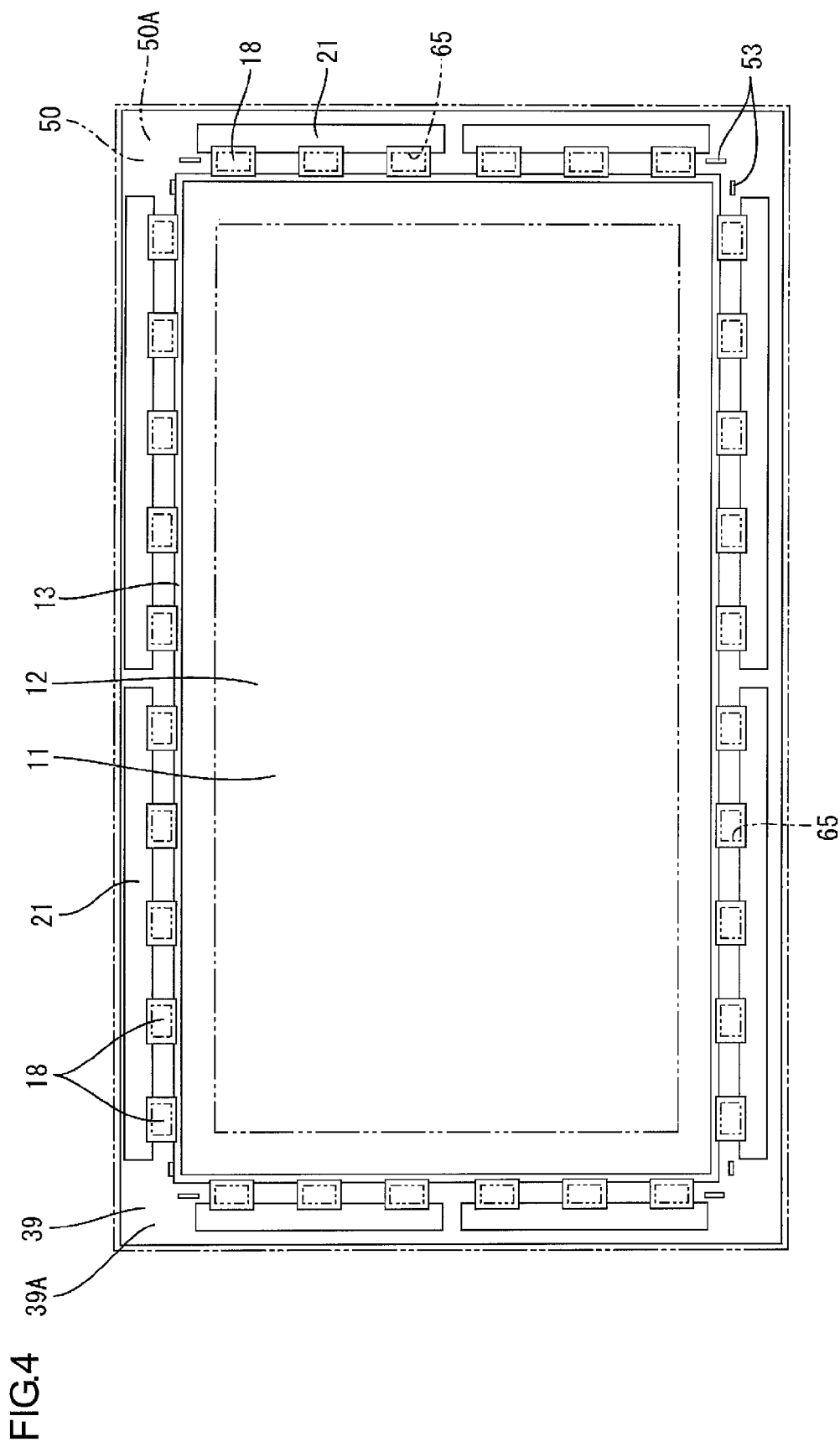
FIG. 4 is a front view illustrating the liquid crystal panel and control boards placed on a frame.

As illustrated in FIG. 4, one end of the short dimension of the flexible printed circuit board 18 is electrically connected to the array substrate of the liquid crystal panel 11. The other end is electrically connected to a control board 21 for controlling the liquid crystal panel 11. The flexible printed circuit board 18 is pressure bonded to the terminal of the array substrate 13 and a terminal of the control board 21 with an anisotropic conductive film (ACF), which is an anisotropic conductive adhesive. The terminal of the control board 21 and the ACF are not shown in the figures.

Each control board 21 is made of synthetic resin and formed in an elongated rectangular plate shape so as to be along the edge of the liquid crystal panel 11 as illustrated in FIG. 4. Electronic components including capacitors and resistors (not shown) are mounted on the surface of the control board 21 and circuit patterns (not shown) are printed on the surface.

A plurality of the control boards 21 are arranged so as to surround the periphery of the liquid crystal panel 11 (or the array substrate 13). The control boards 21 are arranged outside the liquid crystal panel with gaps such that plate surfaces thereof are substantially parallel to the plate surface of the liquid crystal panel 11. The control boards 21 are electrically connected to a control circuit board 41, which will be explained later. The thickness of each control board 21 is slightly smaller than the thicknesses of the boards 12 and 13 of the liquid crystal panel 11.

A counter electrode (not shown) is provided on the CF substrate 12. The counter electrode faces the pixel electrodes 15 on the array board 13. A number of color filters (not shown) are also provided on the CF substrate 12 in locations corresponding to the respective pixels. In the color filters, RGB three colors are arranged in sequence. Polarizing plates (not shown) are attached to the outer surfaces of the boards 12 and 13 as a pair of front and rear plates.

The backlight unit 30 is a so-called direct backlight that is arranged closely behind the liquid crystal panel 11. It includes a chassis 31 having a shallow dish shape, that is, having a recess formed toward the rear. The chassis 31 is made of metal and a reflector sheet 32 is attached to the bottom surface thereof. The reflector sheet 32 is made of synthetic resin and the surface thereof is in white having high light reflectivity.

Light sources (cold cathode tubes 33 in this embodiment) are arranged inside the chassis 31. A plurality of the cold cathode tubes 33 are arranged parallel to each other. Each cold cathode tube 33 is held with a lamp clip 34 that is provided on the surface of the reflector sheet 32. The middle section thereof is held with the lamp clip 34. The ends of each cold cathode tube 33 are connected to connectors 35. The ends of the cold cathode tubes 33 and the connectors 35 are collectively covered with the holders 36. The connectors 35 are electrically connected to the inverter boards 40, which will be explained later.

A diffuser plate 37 and an optical sheet 38 are attached to the chassis 31 on the front side. The diffuser plate 37 includes a plate-like member made of synthetic resin in which light diffusing particles are scattered. It has a function of diffusing linear light emitted from the cold cathode tubes 33 that are linear light sources. The diffuser plate 37 has a rectangular shape that extends in the axial direction of the cold cathode tubes 33. Edge portions located at ends of the long dimension thereof are placed on the holders 36. Edge portions located at ends of the short dimension thereof are placed on the edges of the chassis 31.

The optical sheet 38 is arranged in front of the diffuser plate 37. In this embodiment, the optical sheet 38 includes a diffuser sheet, a lens sheet and a reflection type polarizing plate layered in this order from the diffuser plate 37 side. The optical sheet 38 has a function of converting the light from each cold cathode tube 33 and passed through the diffuser plate 37 to planar light.

A frame 39 having a frame shape is arranged at edge areas of the optical sheet 38 on the front side (see FIG. 2). The edges of the diffuser plate 37 and the optical sheet 38 are sandwiched between the frame 39 and the holders 36 or the chassis 31, and held to the backlight unit 30.

The frame 39 is made of metal. It includes the first plate portions 39A and the second plate portions 39B (see FIG. 5). The first plate portions 39A are formed parallel to the rear surface of the liquid crystal panel 11 and extend from positions corresponding to the edges of the liquid crystal panel 11 and to positions outside the control boards 21. The second plate portions 39B rise from outer edges of the first plate portions 39A toward the rear and extend to the outer surface of the chassis 31. The plate surfaces of the first plate portions 39A are substantially parallel to the plate surfaces of the liquid crystal panel 11 and the control boards 21. The plate surfaces of the second plate portions 39B are substantially perpendicular to the plate surfaces of the liquid crystal panel 11 and the control boards 21.

Panel retainers 53 that hold the outer rims of the liquid crystal panel 11 are provided on the frame 39 (see FIGS. 2 and 4). The panel retainers 53 are formed by cutting parts of the first plate portions 39A of the frame 39 and raising them toward the front so as to face the outer rims of the liquid crystal panel 11. The panel retainers 53 are formed in areas of the first plate portions 39A of the frame 39 outside four corners of the liquid crystal panel 11. A predefined clearance is provided between the panel retainers 53 and the liquid crystal panel 11 to allow thermal expansion of the liquid crystal panel 11.

The inverter boards 40 for controlling the driving of the cold cathode tubes 33 are mounted on the rear surface of the chassis 31. The inverter boards 40 are provided in a pair and arranged at ends of the long dimension of the chassis 31 (see FIG. 2). The control circuit board 41 for controlling the display of the liquid crystal panel 11 is mounted on the rear surface of the chassis 31. The control circuit board 41 is arranged between the inverter boards 40.

The liquid crystal panel 11 is held such that the outer edges thereof are sandwiched between the bezel 50 (a holding member of the claims) having a frame-like shape and the frame 39 of the backlight unit 30. The frame 39 and the bezel 50 are positioned so as to sandwich the outer edges of the liquid crystal panel 11 and the control boards 21 arranged outside the liquid crystal panel 11 therebetween.

The bezel 50 is made of metal. It includes the first plate portions 50A and the second plate portions 50B (see FIG. 5). The first plate portions 50A are arranged parallel to the plate surface of the liquid crystal panel 11 so as to cover the outer edges of the liquid crystal panel 11 and the control boards 21. The second plate portions 50B rise from the outer edges of the first plate portions 50A toward the rear and extend the outer surface of the second plate portions 39B of the frame 39. Plate surfaces of the first plate portions 50A are substantially parallel to the plate surfaces of the liquid crystal panel 11 and the control boards 21. Plate surfaces of the second plate portions 50B are substantially perpendicular to the plate surfaces of the liquid crystal panel 11 and the control boards 21.

Shock absorbers 51 made of elastic materials (e.g., rubbers or formed resins) are arranged between the bezel 50 and the liquid crystal panel 11, and between the frame 39 and the liquid crystal panel 11. Shock absorbers 52 made of elastic materials (e.g., rubbers or formed resins) are arranged between the bezel 50 and the control boards 21, and between the frame 39 and the control boards 21. The liquid crystal display panel 11 is held between the shock absorbers 51, and the control boards 21 are held between the shock absorbers 52 such that they are allowed to move in directions parallel to the plate surfaces, respectively.

Figure 5:
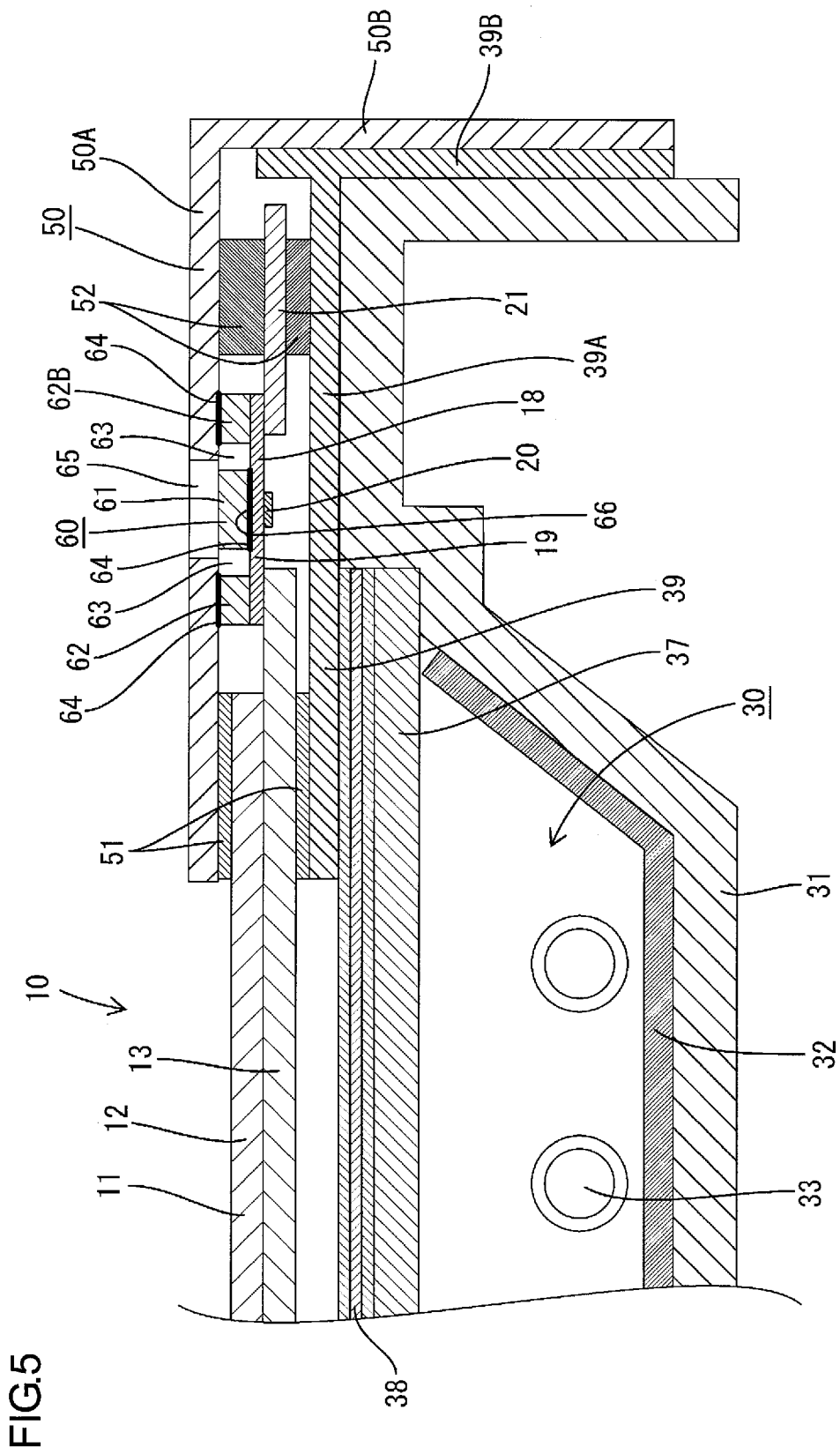
FIG. 5 is a partial cross-sectional view of the liquid crystal display device.

Heat-transfer sheets 60 (heat-transfer members of the claims) are sandwiched between the flexible printed circuit boards 18 and the bezel 50 (see FIG. 5). Each heat-transfer sheet 60 is made of rubber (acrylic elastomer in this embodiment) and in a rectangular overall shape substantially same shape and size as the flexible printed circuit board 18. The thickness of the heat-transfer sheet 60 is substantially uniform and equal to or slightly larger than a distance between the first plate portion 50A of the bezel 50 and the flexible printed circuit board 18.

Figure 6:
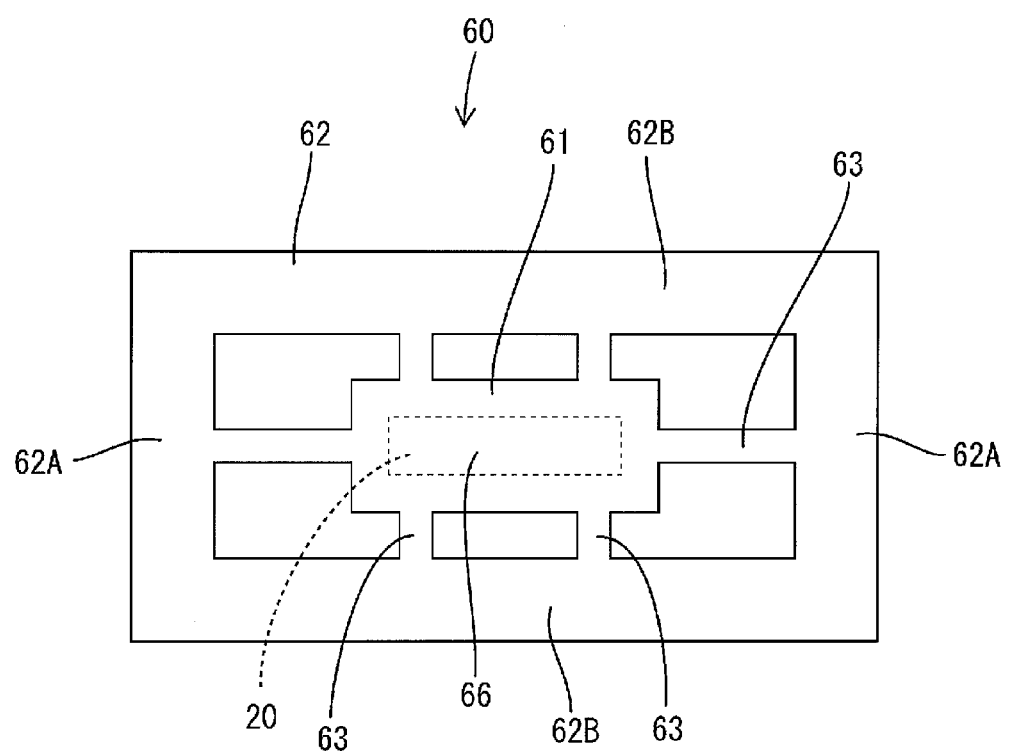
FIG. 6 is a plan view of a heat-transfer sheet.

As illustrated in FIG. 6, each heat-transfer sheet 60 has a central portion 61, a frame portion 62 and a plurality of bridges 63 (a flexible connection portion). Six bridges 63 are provided in this embodiment. The central portion 61 is formed in a rectangular shape slightly larger than the driver 20 on the flexible printed circuit board 18. The frame portion 62 is formed in a frame shape that surrounds the center portion 61. The bridges 63 make connections between the central portion 61 and the frame portion 62.

The central portion 61 of each heat-transfer sheet 60 has a component contact area 66 that is in contact with the central part of the flexible printed circuit board 18 (corresponding to a part of the film 19 on which the driver 20 is mounted). The component contact area 66 of the central portion 61 is in contact with an entire projected area of the driver 20 on the surface of the film 19. The component contact area 66 is located at the center of the central portion 61, and a projected area of the central portion 61 on the film 19 is slightly larger than the projected area of the driver 20 on the film 19. The central portion 61 has a rectangular shape similar to the driver 20 and slightly larger than the driver 20.

Figure 8:
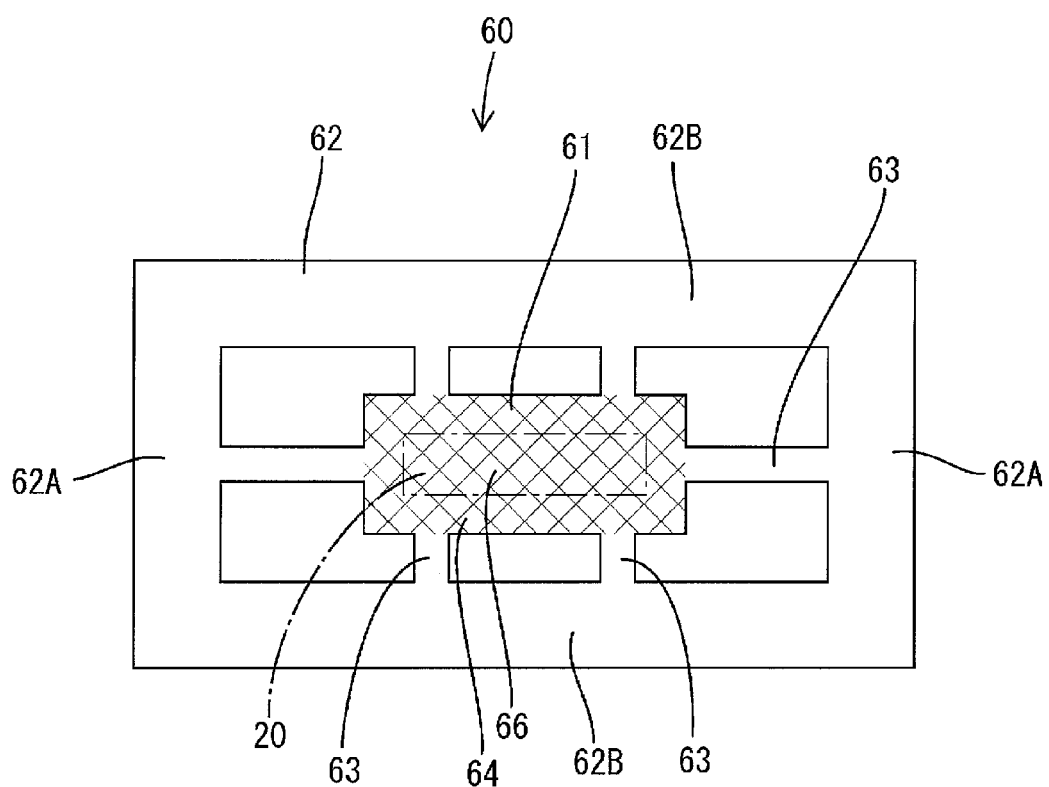
FIG. 8 is a conceptual view illustrating adhesive areas on a rear surface of the heat-transfer sheet and a driver.

The entire rear surface (the surface facing the flexible printed circuit board 18) of the central portion 61 is attached to the surface of the film 19 with double-sided tape 64. In FIG. 8, the area of the rear surface of the heat-transfer sheet 60 to which the double-sided tape 64 is attached is shaded.

The double-sided tape 64 is not attached to the front surface of the central portion 61 (the surface facing the bezel 50). The entire front surface is in contact with the bezel 50 but not attached to it with the double-sided tape 64. The entire front surface of the central portion 61 is exposed to the outside of the bezel 50 through a hole 65, which will be explained later. The entire front surface is not attached to the bezel 50. The central portion 61 corresponds to a circuit board fixing portion.

The frame portion 62 of the heat-transfer sheet 60 has a landscape rectangular shape that forms along the outer edges of the flexible printed circuit board 18. The frame portion 62 includes short-side sections 62A at ends of the long dimension of the central portion 61 and the long-side sections 62B at ends of the short dimension of the central portion 61. The short-side sections 62A are substantially parallel to each other and the long-side sections 62B are substantially parallel to each other. As illustrated in FIG. 5, the long-side sections 62B of the frame portion 62 are located on the front surface of the connection between the flexible printed circuit board 18 and the liquid crystal panel 11, and on the front surface of the connection between the flexible printed circuit board 18 and the control board 21, respectively. The width of the frame portion 62 is substantially constant in the entire area, and the inner edges of the frame portion 62 are substantially parallel to the respective outer edged of the central portion 61.

Figure 7:
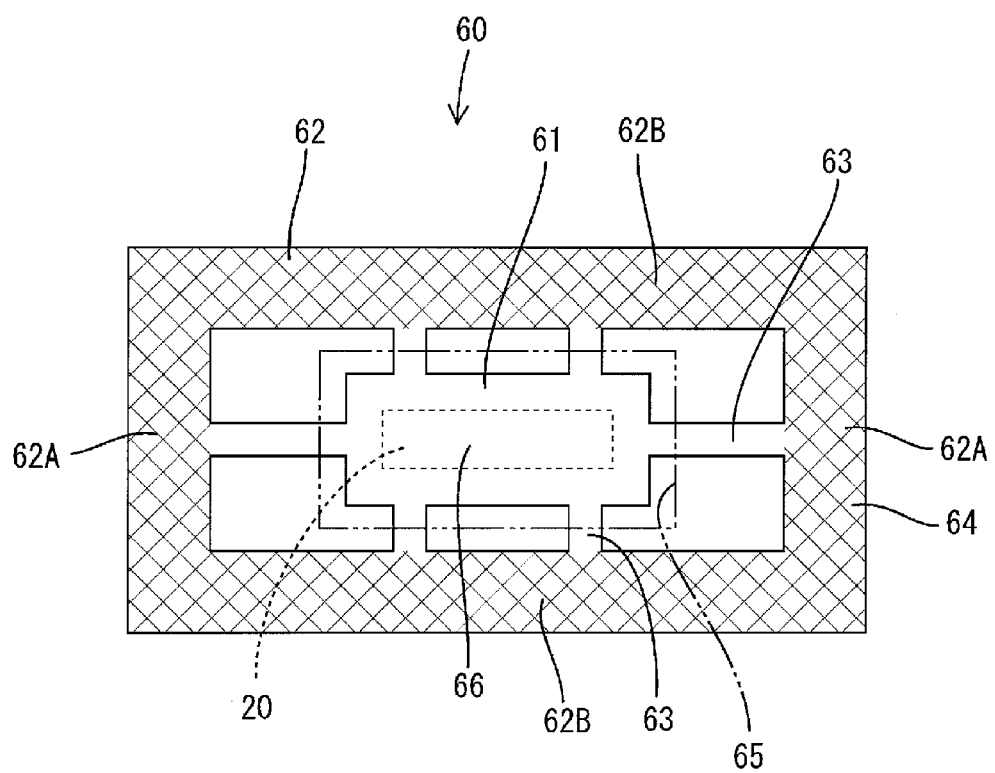
FIG. 7 is a conceptual view illustrating adhesive areas on a front surface of the heat-transfer sheet and a hole.

The frame portion 62 is sandwiched between the first plate portion 50A of the bezel 50 and the flexible printed circuit board 18. The entire front surface of the frame portion 62 (the surface facing the first plate portion 50A of the bezel 50) is attached to the first plate portion 50A of the bezel 50 with the double-sided tape 64. In FIG. 7, the area of the front surface of the heat-transfer sheet 60 to which the double-sided tape 64 is attached is shaded.

The double-sided tape 64 is not attached to the rear surface of the frame portion 62 (the surface facing the flexible printed circuit board 18). It is in contact with the flexible printed circuit board 18 but not attached to it with the double-sided tape 64. The frame portion 62 is not attached to the flexible printed circuit board 18. The frame portion 62 corresponds to a holding member fixing portion.

Each bridge 63 of the heat-transfer sheet 60 makes a connection between the central portion 61 and the frame portion 62. Each bridge 63 has a rectangular shape that extends from the long-side section 62B or the short-side section 62A of the frame portion 62 to the central portion 61 substantially perpendicular to the long-side section 62B or the short-side section 62A. The widths of the bridges 63 are substantially consistent.

Two bridges 63 are provided between each long-side section 62B of the frame portion 62 and the central portion 61. Those two bridges 63 are away from each other with a predefined distance therebetween in the longitudinal direction of the central portion 61, and at locations substantially same distance from the respective ends of the long dimension of the central portion 61.

One bridge 63 is provided between each short-side section 62A of the frame portion 62 and the central portion 61. The bridge 63 is formed on a line that connects a point located at about the center of the short-side 62A and a point located at about the center of the short dimension of the central portion 61.

The double-sided tapes 64 are not attached to the front surfaces (facing the first plate portions of the bezel 50) and the rear surfaces (facing the flexible printed circuit boards 18) of all bridges 63. The surfaces are in contact with the flexible printed circuit boards 18 but not attached to them with the double-sided tapes 64. The bridges 63 are not attached to the bezel 50 or the flexible printed circuit boards 18. The ends of the bridges 63 on the central portion 61 side are exposed to the outside of the bezel 50 through the holes 65, which will be explained later.

An area of each heat-transfer sheet 60 other than the frame portion 62, the bridges 63 and the central portion 61 (the area surrounded by those portions) is a hole that runs in the thickness direction of the heat-transfer sheet 60.

The first plate portions 50A of the bezel 50 have holes 65 through which the central portions 61 of the heat-transfer sheets 60 are exposed (see FIG. 5). Each hole 65 has a rectangular shape slightly larger than the central portion 61. It is formed in the thickness direction of the first plate portion 50A. See FIG. 7 for a location and a size of the hole 65 in the heat-transfer sheet 60. The hole 65 is formed such that the driver 20 is arranged in an area corresponding to around the center of the hole 65. The frame portion 62 of the heat-transfer sheet 60 is attached to the entire edges of the hole 65. As illustrated in FIG. 4, the holes 65 are formed one for each flexible printed circuit board 18. In FIG. 4, the bezel 50 is illustrated with two-dashed chain lines.

Next, an assembly process of the liquid crystal display device 10 will be explained. The liquid crystal panel 11 and the backlight unit 30 are separately prepared, and they are assembled. Specifically, the liquid crystal panel 11 is set by placing it inside the panel holding members 53 of the frame 39 of the backlight unit 30.

Then the bezel 50 is attached from the front side. Prior to the attachment, the frame portions 62 of the heat-transfer sheets 60 are attached to the rims of the respective holes 65 of the bezel 50. Moreover, the double-sided tapes 64 are attached to the rear surfaces of the central portions 61 of the heat-transfer sheets 60 or the front surfaces of the central portions of the flexible printed circuit boards 18.

When the bezel 50 is attached to the front side of the frame 39, the central portions 61 of the heat-transfer sheets 60 are attached to the central portions of the flexible printed circuit boards 18. The bezel 50, the frame 39 and the chassis 31 are fixed together with screws (not shown), and then the liquid crystal panel 11 and the backlight unit 30 are held together. This completes the assembly process of the liquid crystal display device 10.

Next, operations and effects of the first embodiment having the above configurations will be explained.

When the backlight unit 30 is turned on and off while the liquid crystal display device 10 is in use, thermal expansion and contraction occur in each component. Especially, the frame 39, the bezel 50 or the substrates 12 and 13 in the liquid crystal panel 11 are large in size than other components (e.g., the control boards 21). Therefore, thermal expansions and contractions (or variations in thermal deformations) are larger than other components. The substrates 12 and 13 that are made of glass and the frame 39 or the bezel 50 that are made of metal have different thermal expansion coefficients.

If the flexible printed circuit boards connected to the liquid crystal panel and the bezel are fixed together via the heat-transfer sheets such as in known devices, stresses may be applied to connections between the flexible printed circuit boards and the liquid crystal panel. This may happen because the thermal expansion coefficients of the liquid crystal panel and the bezel differ significantly from each other.

In this embodiment, the surfaces of the heat-transfer sheets 60 facing the flexible printed circuit boards 18 are attached to the flexible printed circuit boards 18 with the double-sided tapes 64. Moreover, the surface of each heat transfer sheet 60 facing the bezel 50 includes the central portion 61 (the circuit board fixing portion), the frame portion 62 (the holding member fixing portion) and the bridges 63 (the flexible connection portion). The central portion 61 is not attached to the bezel 50. The frame portion 62 has the surface facing the bezel 50 and attached to the bezel 50, and the surface facing the flexible printed circuit board 18 and separated from the flexible printed circuit board 18. Each bridge 63 is formed so as to make a connection between the central portion 61 and the frame portion 62. The bridge 63 has the surface facing the flexible printed circuit board 18 and the surface facing the bezel 50 separated from the flexible printed circuit board 18 and the surface facing the bezel 50, respectively. With the above configuration, the bridges 63 are deformable and thus the central portion 61 and the frame portion 62 can move relative to each other. Namely, the central portion 61 and the frame portion 62 move relative to each other while the bridges 63 elastically expand or contract according to the thermal deformations of the liquid crystal panel 11 and the bezel 50. Even when the amounts of the thermal deformations of the liquid crystal panel 11 and the bezel 50 differ from each other, the central portion 61 and the frame portion 62 move along the flexible printed circuit board 18 and the bezel 50, respectively. Therefore, the amount of force applied to the connection between the flexible printed circuit board 18 and the liquid crystal panel 11 is small compared to the known devices. As a result, the display quality is less likely to decrease.

Each hole 65 formed in the bezel 50 is larger than the central portion 61 of the heat-transfer sheet 60. Therefore, the central portion 61 of the heat-transfer sheet 60 is not in contact with the bezel 50 and thus a force against the movement of the central portion 61 (e.g., a friction force) is less likely to be produced. The force applied to the connection between the flexible printed circuit board 18 and the liquid crystal panel 11 is further reduced and the display quality is further less likely to decrease.

The holes 65 are provided one for each flexible printed circuit board 18. Therefore, the force applied to the connection between the flexible printed circuit board 18 and the liquid crystal panel 11 can be reduced for all connections between the flexible printed circuit boards 18 and the liquid crystal panel 11.

Each flexible printed circuit board 18 includes the driver 30 mounted on the film 19. The central portion 61 has the component contact area 66 that is in contact with the area of the film 19 in which the driver 20 is mounted. Because the heat-transfer sheet 60 is in contact with the driver 20 that is most likely to produce heat among the components of the flexible printed circuit board 18, this configuration is preferable for dissipating the heat.

The central portion 61 of each heat-transfer sheet 60, which is in contact with the area in which the driver 20 is mounted, is attached to the flexible printed circuit board 18. The central portion 61 remains in contact with the driver and thus high heat dissipation rate can be achieved.

According to the first embodiment, the central portion 61 and the frame portion 62 of each heat-transfer sheet 60 can move relative to each other along with the deformations of the bridges 63. Even when the amounts of the thermal deformations of the liquid crystal panel 11 and the bezel 50 differ from each other, the central portion 61 moves along with the flexible printed circuit board 18 and the frame portion 62 moves along with the bezel 50. Therefore, the force applied to the connection between the flexible printed circuit board 18 and the liquid crystal panel 11 is reduced and thus the display quality is less likely to decrease.

Second Embodiment

Figure 9:
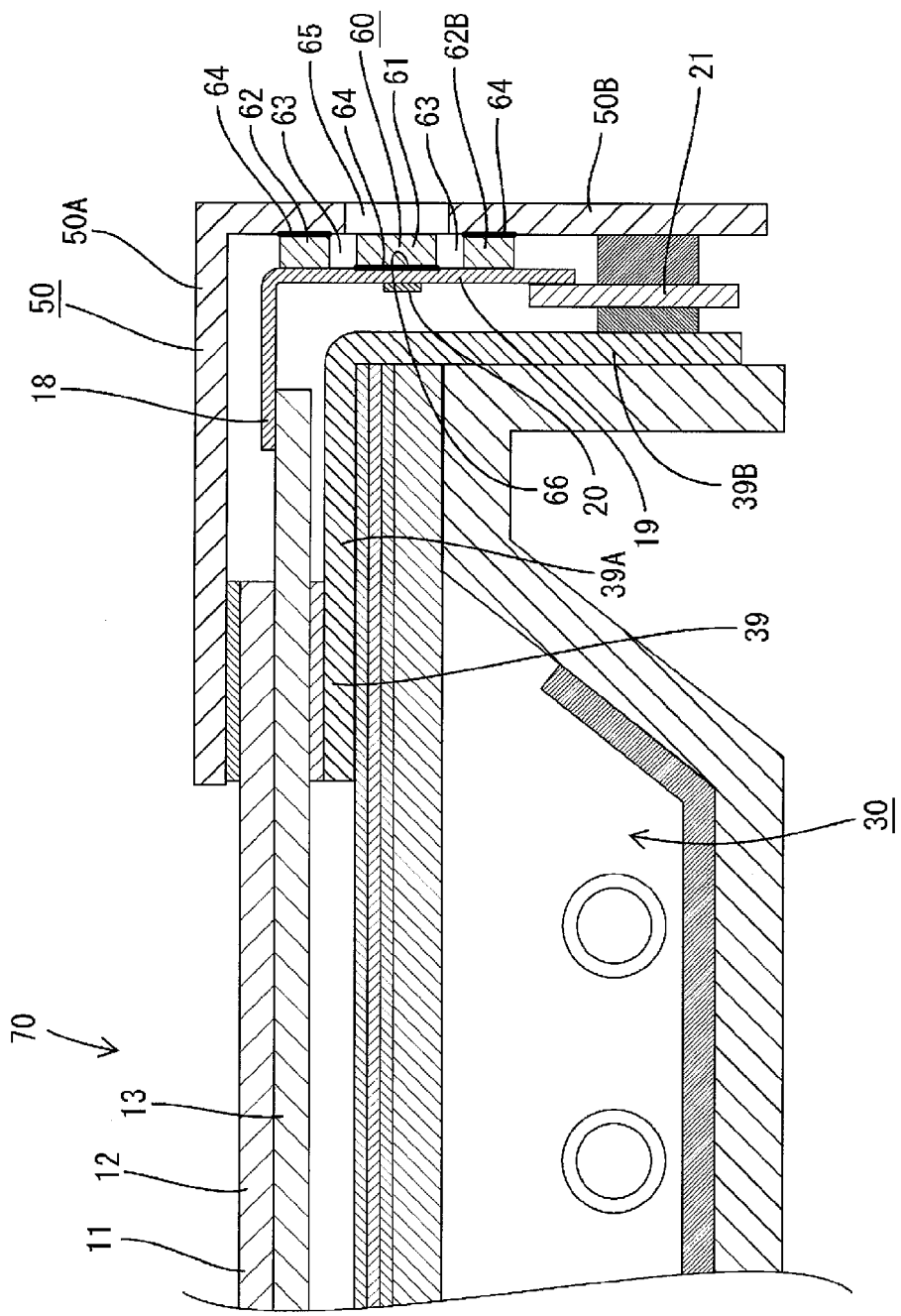
FIG. 9 is a partial cross-sectional view of a liquid crystal display device according to the second embodiment.

A liquid crystal display device 70 in a television receiver according to the second embodiment of the present invention will be explained with reference to FIG. 9.

The liquid crystal display device 70 of this embodiment includes the holes 65 in the second plate portions 50B of the bezel 50 instead of the first plate portions 50A as in the first embodiment. The same parts as the first embodiment will be indicated by the same symbols and will not be explained.

The liquid crystal display device 70 includes the liquid crystal panel 11 configured to display images and the backlight unit 30 configured to illuminate the liquid crystal panel 11 as in the first embodiment. They are held together with a holding member such as the bezel 50.

Each flexible printed circuit board 18 is bent from the array board 13 of the liquid crystal panel 11 in a substantially vertical direction toward the rear side. The control boards 21 are arranged such that the plate surface of each control board 21 is substantially perpendicular to the plate surface of the liquid crystal panel 11. Each flexible printed circuit board 18 is sandwiched between the second plate portion 39B of the frame 39 and the second plate portion 50B of the bezel 50 so as to be substantially parallel to both second plate portions 39B, 50B. The driver 20 of the flexible printed circuit board 18 faces the frame 39.

The heat-transfer sheets 60 are provided between the flexible printed circuit boards 18 and the second plate portion 50B of the bezel 50. As in the first embodiment, each heat-transfer sheet 60 has the central portion 61, the frame portion 62 and six bridges 63. The central portion 61 is formed in a rectangular shape slightly larger than the driver 20. The frame portion 62 is formed so as to surround the central portion 61. Each bridge 63 makes a connection between the central portion 61 and the frame portion 62.

As in the first embodiment, the central portion 61 of the heat-transfer sheet 60 has the component contact area 66 that is in contact with the central portion of the flexible printed circuit board 18 (corresponding to the area of the film 19 in which the driver 20 is mounted). Only the inner surface (facing the flexible printed circuit board 18) of the central portion 61 is attached to the outer surface of the film 19 with the double-sided tape 64. The outer surface is not attached to the bezel 50.

As in the first embodiment, the outer surface of the frame portion 62 of each heat-transfer sheet 60 is attached to the rim of the hole in the bezel 50, and the inner surface is not attached to the flexible printed circuit board 18.

As in the first embodiment, each bridge 63 makes a connection between the central portion 61 and the frame portion 62. The inner surface of the bridge 63 is not attached to the bezel 50 and the outer surface of the bridge 63 is not attached to the flexible printed circuit board 18.

The second plate portions 50B of the bezel 50 have the holes 65 through which the central portions 61 of the heat-transfer sheets 60 are exposed. As in the first embodiment, each hole 65 is formed in a rectangular shape slightly larger than the central portion 61 and in the thickness direction of the second plate portion 50B. The holes 65 are provided one for each flexible printed circuit board 18. The frame portions 62 of the heat-transfer sheets 60 are attached to the rims of the respective holes 65.

As describe above, in this embodiment, the central portion 61 and the frame portion 62 of each heat-transfer sheet 60 can move relative to each other along with the deformations of the bridges 63. As in the first embodiment, even when the amounts of the thermal deformations of the liquid crystal panel 11 and the bezel 50 differ from each other, the central portion 61 moves along with the flexible printed circuit board 18 and the frame portion 62 moves along with the bezel 50. Therefore, the force applied to the connection between the flexible printed circuit board 18 and the liquid crystal panel 11 can be reduced and thus the display quality is less likely to decrease.

Other Embodiments

The present invention is not limited to the above embodiments explained in the above description. The following embodiments may be included in the technical scope of the present invention, for example.

Figure 10:
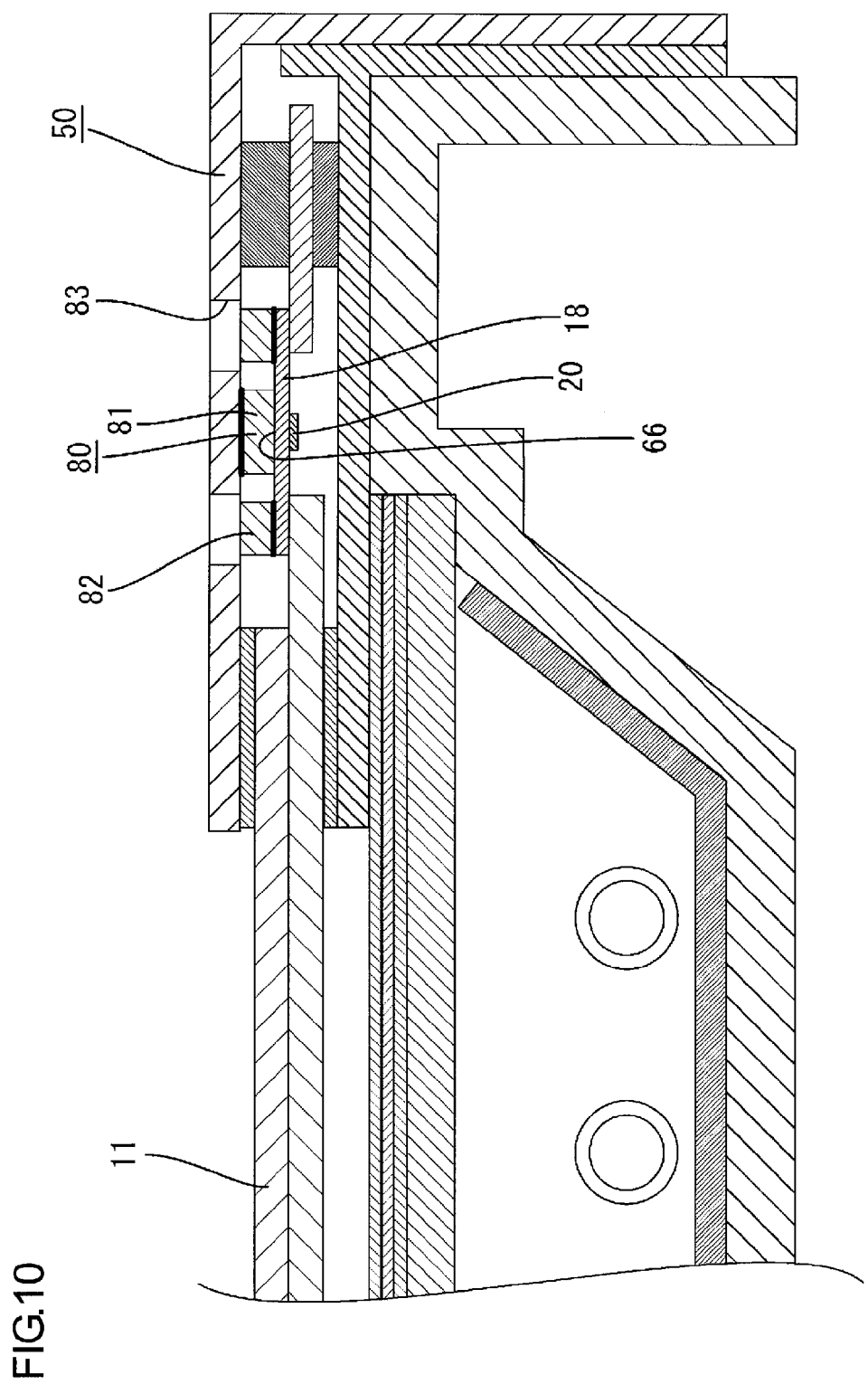
FIG. 10 is a partial cross-sectional view of a liquid crystal display device according to other embodiment (1)

(1) In the above embodiments, the central portion 61 and the frame portion 62 of each heat-transfer sheet 60 are fixed to the flexible printed circuit board 18 and the bezel 50, respectively. However, as illustrated in FIG. 10, a central portion 81 and a frame portion 82 of each heat-transfer sheet 80 may be attached to the bezel 50. In this case, a hole 83 may be provided in an area of the bezel 50 such that the frame portion 82 is exposed. Moreover, the projected area of the central portion 81 on the flexible printed circuit board 18 should be defined larger than the projected area of the driver 20 on the flexible printed circuit board 18. With this configuration, the central portion 81 and the driver 20 remain in contact with each other even when the central area 81 moves relative to the flexible printed circuit board 18 because the central portion 81 is larger than the driver 20. Therefore, high heat dissipation rate can be achieved.

Figure 11:
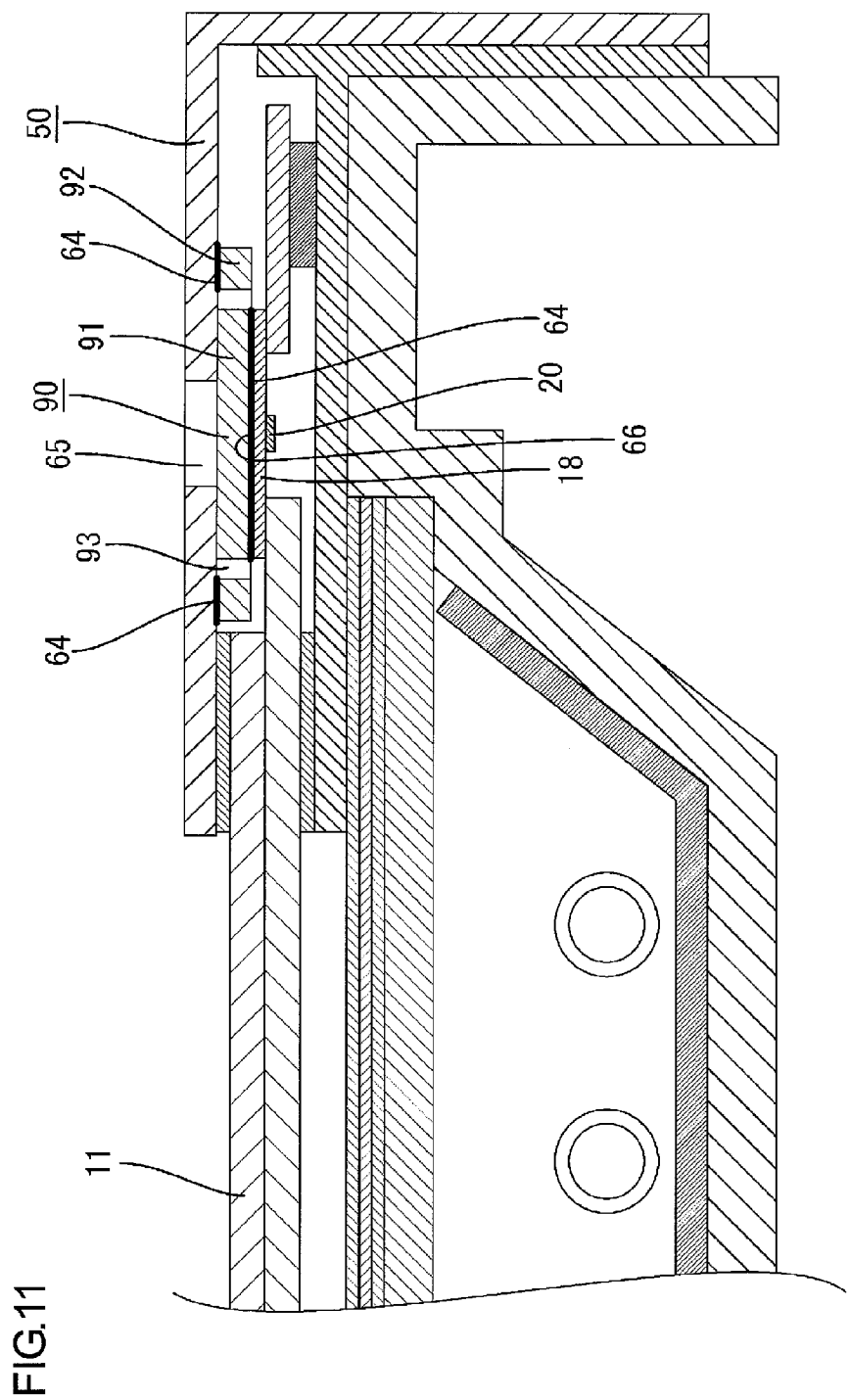
FIG. 11 is a partial cross-sectional view of a liquid crystal display device according to other embodiment (2).

(2) In the above embodiments, each heat-transfer sheet 60 is formed in substantially same shape and size as the flexible printed circuit board 18. However, the heat-transfer sheet may be smaller or larger than that. For example, a heat-transfer sheet 90 illustrated in FIG. 11 includes a central portion 91 having substantially same shape and size as the flexible printed circuit board 18, a frame portion 92 around the central portion 91 and bridges 93 that make connections between the central portion 91 and the frame portion 92.

(3) In the above embodiments, each heat-transfer sheet 60 includes the central portion 61, the frame portion 62 and the bridges 63. The frame portion 62 is provided around the central portion 61. The bridges 63 make connections between the central portion 61 and the frame portion 62. However, the heat-transfer sheet may include a central portion, a pair of side edge portions located on respective sides of the central portion, and bridges that make connections between the central portion and the side edge portions.

(4) In the above embodiments, each heat-transfer sheet 60 is formed in a rectangular shape along the outline of the flexible printed circuit board 18. However, the heat-transfer sheet is not limited to such a shape. For example, the heat-transfer sheet may be formed in an elliptical overall shape.

(5) In the above embodiments, the flexible connection portions are the bridges 63 that make connections between the central portion 61 and the frame portion 62. However, the flexible connection portion may include deformable plates having smaller thickness than those of the other portions (i.e., the central portion and the frame portion). Alternatively, materials that deform more significantly than other portions may be used for the flexible connection portion.

(6) In the above embodiments, each heat-transfer sheet 60 includes the central portion 61, the frame portion 62 around the central portion 61 and the bridges that make connections between the central portion 61 and the frame portion 62. However, the heat-transfer sheet may be a single plate. In this case, an area that is attached to the bezel and an area that is attached to the flexible printed circuit board should be clearly defined and separated from each other.

(7) In the above embodiments, each hole 65 is formed such that the entire central portion 61 of the corresponding heat-transfer sheet 60 is exposed to the outside of the bezel 60. However, the hole may be formed such that only a part of the central portion 61 of the heat-transfer sheet 60 is exposed. With this configuration, the contact area between the central portion and the bezel is reduced and thus the force against the movement of the central portion is reduced. Namely, the force applied to the connection between the flexible printed circuit board and the liquid crystal panel can be reduced.

(8) In the above embodiments, the holes 65 are provided in the locations corresponding to the respective flexible printed circuit boards 18. However, the holes 65 may be provided in locations corresponding to some of the flexible printed circuit boards 18.

(9) In the above embodiment, only the central portion 61 (the circuit board fixing portion) of each heat-transfer sheet 60 attached to the flexible printed circuit board is in contact with the projected area of the driver 20 on the film 19. However, the circuit board fixing portion attached to the flexible printed circuit board and the holding member fixing portion attached to the bezel may be in contact with parts of the driver, respectively.

(10) In the above embodiment, each printed circuit board 18 has the configuration in which the driver 20 is mounted on the rear surface of the film 19 and the area of the film 19, which corresponds to the projected area of the driver 20, is in contact with the central portion 61 of the heat transfer sheet 60. However, the driver may be mounted on the front surface of the film and the central portion may be directly in contact with the driver.

(11) In the above embodiment, the holes 65 are provided one for each flexible printed circuit board 18. However, the holes may be provided one for each several flexible printed circuit boards such that a plurality of the printed circuit boards 18 are exposed collectively.

(12) In the above embodiment, the heat-transfer sheets 60 are sandwiched between the bezel 50 and the flexible printed circuit boards 18. However, the heat-transfer sheets may be sandwiched between the flexible printed circuit board and any part that is arranged so as to face the flexible printed circuit boards. For example, if a flexible printed circuit board and a frame are arranged so as to face each other in a liquid crystal display device having a different configuration, the heat-transfer sheets may be arranged between the flexible printed circuit board and the frame. If the flexible printed circuit boards and the chassis are arranged so as to face each other, the heat-transfer sheets may be arranged between the flexible printed circuit board and the chassis.

(13) In the above embodiment, each hole 65 is formed such that the entire central portion 61 of the heat-transfer sheet 60 and a part of each bridge 63 are exposed. However, the entire central portion and the entire bridges may be exposed. In this configuration, the central portion and the bridges are not in contact with the bezel. Therefore, the forces against the movement of the central portion and the deformations of the bridges are further reduced. As a result, the force applied to the connection between the flexible printed circuit board and the liquid crystal panel is reduced and thus the display quality is least likely to decrease.

(14) In the above embodiment, each hole 65 is formed in a rectangular shape. However, it may be formed in an elliptical shape.

(15) In the above embodiment, the double-sided tapes 64 are used to attach the heat-transfer sheets 60. However, other types of adhesives can be used.

The invention claimed is:

1. A display device comprising:
   a display panel configured to display images;
   a holding member holding the display panel;
   at least one circuit board arranged so as to face the holding member and connected to the display panel; and
   at least one heat-transfer member arranged between the circuit board and the holding member so as to be in contact with the circuit board and the holding member, the heat-transfer member having a circuit board fixing portion, a holding member fixing portion and a flexible connection portion that makes a connection between the circuit board fixing portion and the holding member fixing portion, the circuit board fixing portion being attached to the circuit board and separated from the holding member, and the holding member fixing portion being attached to the holding member and separated from the circuit board.

2. The display device according to claim 1, wherein the flexible connection portion is separated from the circuit board fixing portion and the holding member.

3. The display device according to claim 1, wherein the holding member has a hole through which at least a part of the circuit board fixing portion is exposed.

4. The display device according to claim 3, wherein the hole is formed in a size such that an entire surface of the circuit board fixing portion on a holding member side is exposed through the hole.

5. The display device according to claim 3, wherein the hole is formed in a size such that entire surfaces of the circuit board fixing portion and the flexible connection portion on a holding member side are exposed through the hole.

6. The display device according to claim 1, wherein:
   the at least one circuit board includes a plurality of the circuit boards arranged along the holding member; and
   the at least one heat-transfer member includes a plurality of the heat-transfer members arranged between the circuit boards and the holding member.

7. The display device according to claim 1, wherein:
   each of the at least one circuit board includes an electronic component mounted on a surface opposite from the holding member side; and
   each of the at least one heat-transfer member has a component contact area that is in contact with an area of a surface of the circuit board opposite from the surface on which the electronic component is mounted, the component contact area is provided in a location that corresponds to a rear surface of the electronic component.

8. The display device according to claim 1, wherein:
each of the at least one circuit board includes an electronic component mounted on a surface on the holding member side; and
each of the at least one heat-transfer member has a component contact area that is in contact with the electronic component is mounted, the component contact area being provided in a location that corresponds to a rear surface of the electronic component.

9. The display device according to claim 7, wherein a projected area of the component contact area on the circuit board is larger than a projected area of the electronic component on the circuit board.

10. The display device according to claim 7, wherein the circuit board fixing portion includes the component contact area.

11. The display device according to claim 1, wherein:
the heat-transfer member has a central portion and a frame portion that is provided around a central portion;
any one of the central portion and the frame portion corresponds to the circuit board fixing portion; and
another one of the central portion and the frame portion corresponds to the holding member fixing portion.

12. The display device according to claim 11, wherein the at least one flexible connection portion includes a plurality of bridges that make connections between the central portion and the frame portion.

13. The display device according to claim 1, wherein the display panel is a liquid crystal panel including liquid crystals.

14. A television receiver comprising the display device according to claim 1.

* * * * *